(12) United States Patent
Hori et al.

(10) Patent No.: US 10,753,376 B2
(45) Date of Patent: Aug. 25, 2020

(54) HYDRAULIC CYLINDER SPOOL VALVE DEVICE

(71) Applicant: Komatsu Ltd., Tokyo (JP)

(72) Inventors: Shuuji Hori, Oyama (JP); Masato Kageyama, Oyama (JP); Mutsumi Ono, Oyama (JP); Hiroyuki Chikugo, Oyama (JP); Akira Hasebe, Oyama (JP); Junichi Fukushima, Oyama (JP); Shunsuke Koike, Oyama (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 16/069,207

(22) PCT Filed: Jan. 29, 2016

(86) PCT No.: PCT/JP2016/052769
§ 371 (c)(1),
(2) Date: Jul. 11, 2018

(87) PCT Pub. No.: WO2017/130404
PCT Pub. Date: Aug. 3, 2017

(65) Prior Publication Data
US 2019/0003497 A1 Jan. 3, 2019

(51) Int. Cl.
*F15B 11/04* (2006.01)
*F15B 13/04* (2006.01)
(Continued)

(52) U.S. Cl.
CPC ...... *F15B 13/0402* (2013.01); *F15B 11/0426* (2013.01); *F15B 11/10* (2013.01);
(Continued)

(58) Field of Classification Search
CPC .......................................... F15B 2211/40592
See application file for complete search history.

(56) References Cited

U.S. PATENT DOCUMENTS

| 5,165,448 A | * | 11/1992 | Handte | F15B 13/043 |
| | | | | 137/625.62 |
| 5,261,234 A | * | 11/1993 | Holloway | E02F 9/2228 |
| | | | | 137/625.65 |
| 6,561,076 B2 | * | 5/2003 | Hou | A01B 63/00 |
| | | | | 60/386 |
| 7,318,292 B2 | * | 1/2008 | Helbling | E02F 9/2214 |
| | | | | 37/348 |

(Continued)

FOREIGN PATENT DOCUMENTS

| CN | 101004615 A | 7/2007 |
| CN | 200993263 Y | 12/2007 |

(Continued)

OTHER PUBLICATIONS

International Search Report dated Apr. 26, 2016, issued for PCT/JP2016/052769.

*Primary Examiner* — F Daniel Lopez
(74) *Attorney, Agent, or Firm* — Locke Lord LLP

(57) ABSTRACT

A hydraulic cylinder spool valve device, which extends and retracts a cylinder rod of a hydraulic cylinder, includes: a first spool valve having a first dead band and a first opening characteristic; a second spool valve having a second dead band and a second opening characteristic; and a controller performing communication with the hydraulic cylinder by using the first spool valve and positioning the second spool of the second spool valve within the second dead band and performing communication with the hydraulic cylinder by using the second spool valve and positioning the first spool of the first spool valve within the first dead band, and adjusting a characteristic of a switching dead band between the first opening characteristic and the second opening characteristic.

8 Claims, 5 Drawing Sheets

(51) Int. Cl.
  *F15B 11/042*   (2006.01)
  *F15B 13/12*    (2006.01)
  *F15B 11/10*    (2006.01)
  *F15B 13/042*   (2006.01)
  *F15B 13/043*   (2006.01)
  *F16K 31/06*    (2006.01)
  *E02F 9/22*     (2006.01)

(52) U.S. Cl.
  CPC ...... *F15B 13/0422* (2013.01); *F15B 13/0435* (2013.01); *F15B 13/12* (2013.01); *F16K 31/0668* (2013.01); *E02F 9/22* (2013.01); F15B 11/0406 (2013.01); F15B 2211/30565 (2013.01); F15B 2211/32 (2013.01); F15B 2211/329 (2013.01); F15B 2211/40592 (2013.01); F15B 2211/634 (2013.01); F15B 2211/665 (2013.01); F15B 2211/6658 (2013.01); F15B 2211/7053 (2013.01)

(56)          References Cited

U.S. PATENT DOCUMENTS 8,479,870 B2      7/2013  Yoda et al.
  8,899,035 B2     12/2014  Nishikawa et al.
  2006/0174757 A1   8/2006  Iwase et al.
  2012/0036845 A1   2/2012  Nishikawa et al.
  2012/0160594 A1   6/2012  Yoda et al.

FOREIGN PATENT DOCUMENTS

CN     102414454 A    4/2012
  CN     102530068 A    7/2012
  CN     103629190 A    3/2014
  JP      61-296405 A  12/1986
  JP      H07-35105 A   2/1995
  JP      07-110004 A   4/1995
  JP     2005-036936 A  2/2005
  JP        2011-6262 A 1/2011

* cited by examiner

HYDRAULIC CYLINDER SPOOL VALVE DEVICE

FIELD

The present disclosure relates to a hydraulic cylinder spool valve device in which a dead band can be adjusted during a mutual switching between extension and retraction direction operations of a cylinder rod of a hydraulic cylinder is possible.

BACKGROUND

Recently, in a hydraulic excavator or a working machine such as a bulldozer, there has been proposed a Global Positioning System (GPS) or the like is mounted in order to detect its position, compare the positional information with a construction information indicating the topology of the construction site, and obtaining the posture of the working machine by an arithmetic processing based on a comparison between the positional information and the construction information indicating the topography of a construction, to automatically control a movement of the working machine and provide a guidance display of the construction situation on a monitoring device by contrasting between the posture or the position of the working machine and the construction information. The construction using a working machine by using the Information and Communications Technology (ICT) as described above is called an informatization construction. According to the informatization construction, a high-precision construction can be performed even by an operator who is not skilled in the working machine operation. In addition, according to the informatization construction, previously required surveying work and finishing stake work may be significantly reduced.

CITATION LIST

Patent Literature

Patent Literature 1: Japanese Laid-open Patent Publication No. H07-110004

SUMMARY

Technical Problem

In the related art, in a case where an operator manually operates a bulldozer to perform a blade-based ground leveling work, a switching is performed between, for example, a blade lowering operation for lowering the blade by extending a cylinder rod of a lift cylinder and a blade lifting operation for lifting the blade by retracting the cylinder rod. Here, a certain dead band is provided at the switching position where the blade lifting operation and the blade lowering operation are switched by a lever with respect to the spool stroke of a spool valve. This is because if no dead band is provided, an operator who is accustomed to a normal operation may feel uncomfortable with a sudden switching between the working machine blade lifting and lowering operations.

On the other hand, when an automatic control is performed based on the informatization construction, if the dead band exists upon switching between the blade lifting and blade lowering operations, a blade responsiveness may be deteriorated. That is, in a case where the automatic control is performed based on informatization construction, if the dead band is provided between a retraction opening characteristics and an extension opening characteristics with respect to the spool stroke of the spool valve. Accordingly, it is preferable that the switching be performed at a neutral point without proving the dead band.

Therefore, it is desirable that the dead band is variable in accordance with the operation content such as a manual operation, and an automatic operation.

As described in Patent Literature 1, When a spool valve is used, by which the retraction opening characteristic and the extension opening characteristic are switched without intervening the dead band, the responsiveness of switching is enhanced between the retraction opening characteristic and the extension opening characteristic. However, due to no dead band, operability is deteriorated. In addition, due to no dead band with respect to the spool stroke, when the spool stroke is attempted to be kept at the neutral point, the cylinder rod is lowered naturally due to a leakage of a working fluid in the spool valve, or the stopped state of the cylinder rod cannot be maintained due to an inertial force.

The present disclosure has been made in view of the above-described circumstances, and an object thereof is to provide a hydraulic cylinder spool valve device by which it becomes possible to adjust the dead band during a mutual switching between the retraction opening characteristic and the extending opening characteristic of a cylinder rod of a hydraulic cylinder.

Solution to Problem

To resolve the above problem and to attain an object, according to the present disclosure, a hydraulic cylinder spool valve device, which extends and retracts a cylinder rod of a hydraulic cylinder by controlling a flow direction and a flow rate of a working fluid by moving spools in accordance with operation command values, includes: a first spool valve having a characteristic which includes a first dead band and a first opening characteristic in which an opening area of the working fluid supplied in a direction in which the cylinder rod is extended, increases in accordance with a movement of a first spool; a second spool valve having a characteristic which includes a second dead band and a second opening characteristic in which the opening area of the working fluid supplied in a direction in which the cylinder rod is retracted, increases in accordance with a movement of a second spool; and a controller performing communication with the hydraulic cylinder by using the first spool valve and positions the second spool of the second spool valve within the second dead band when the working fluid is supplied in accordance with the first opening characteristic, performing communication with the hydraulic cylinder by using the second spool valve and position the first spool of the first spool valve within the first dead band when the working fluid is supplied in accordance with the second opening characteristic, and adjusting a characteristic of a switching dead band between the first opening characteristic and the second opening characteristic during switching between the first opening characteristic and the second opening characteristic.

Further, in the hydraulic cylinder spool valve device according to the present disclosure, in the above disclosure, the characteristic of the first spool valve further includes a third opening characteristic in which the opening area of the working fluid supplied in the direction in which the cylinder rod is retracted, increases in accordance with the movement of the first spool from the first dead band, the characteristic of the second spool valve further includes a fourth opening characteristic in which the opening area of the working fluid, supplied in the direction in which the cylinder rod is extended, increases in accordance with the movement of the second spool from the second dead band, and the controller further performing communication with the hydraulic cylinder by using the first spool valve and positioning the second spool of the second spool valve within the second dead band when the working fluid is supplied in accordance with the third opening characteristic, performing communication with the hydraulic cylinder by using the second spool valve and positioning the first spool of the first spool valve within the first dead band when the working fluid is supplied in accordance with the fourth opening characteristic; and adjusts a switching dead band between the third opening characteristic and the fourth opening characteristic during switching between the third opening characteristic and the fourth opening characteristic.

Further, in the hydraulic cylinder spool valve device according to the present disclosure, in the above disclosure, the controller adjusts the switching dead band to zero.

Further, in the hydraulic cylinder spool valve device according to the present disclosure, in the above disclosure, the controller performs control for setting the opening of the first spool immediately after switching or the opening of the second spool immediately after switching to zero and causes the first spool or the second spool to stand by at a position immediately before opening when the controller adjusts the switching dead band to zero.

Further, in the above disclosure, the hydraulic cylinder spool valve device according to the present disclosure further includes a selection switch to select between an automatic operation mode and a manual operation mode. Further, the controller sets the switching dead band to zero and performs spool control for generating an opening characteristic in which the first opening characteristic and the second opening characteristic are combined with each other when the automatic operation mode is selected, and sets the switching dead band to have a predetermined value and performs spool control for generating an opening characteristic in which the third opening characteristic and the fourth opening characteristic are combined with each other when the manual operation mode is selected.

Further, in the above disclosure, the hydraulic cylinder spool valve device according to the present disclosure further includes a switching switch selectively switching between the opening characteristic for the automatic operation mode and the opening characteristic for the manual operation mode.

Further, in the hydraulic cylinder spool valve device according to the present disclosure, in the above disclosure, the first opening characteristic and the third opening characteristic of the first spool valve are asymmetric with respect to a neutral position of the first spool, and the fourth opening characteristic and the second opening characteristic of the second spool valve are asymmetric with respect to a neutral position of the second spool.

Further, in the above disclosure, the hydraulic cylinder spool valve device according to the present disclosure further includes a first stroke detection sensor detecting a stroke of the first spool; and a second stroke detection sensor detecting a stroke of the second spool. Further, the controller adjusts the switching dead band based on the strokes detected by the first stroke detection sensor and the second stroke detection sensor.

Advantageous Effects of Disclosure

According to the present disclosure, the hydraulic cylinder spool valve device includes the first spool valve having the first dead band and having the first opening characteristic increasing the opening area of the working fluid supplied in the direction in which the cylinder rod is extended in accordance with the movement of the first spool and the second spool valve having the second dead band and having the second opening characteristic increasing the opening area of the working fluid supplied in the direction in which the cylinder rod is retracted in accordance with the movement of the second spool, and the switching dead band between the first opening characteristic and the second opening characteristic is adjusted during the switching between the first opening characteristic and the second opening characteristic. As a result, a dead band adjustment during mutual switching between extension and retraction direction operations of the cylinder rod of the hydraulic cylinder becomes possible, and the first opening characteristic and the second opening characteristic can be obtained that have desired dead bands corresponding to the operation content such as a manual operation and an automatic operation.

DESCRIPTION OF EMBODIMENTS

Hereinafter, a hydraulic cylinder spool valve device according to an embodiment of the present disclosure will be described with reference to the accompanying drawings.

Overall Configuration

Figure 1:
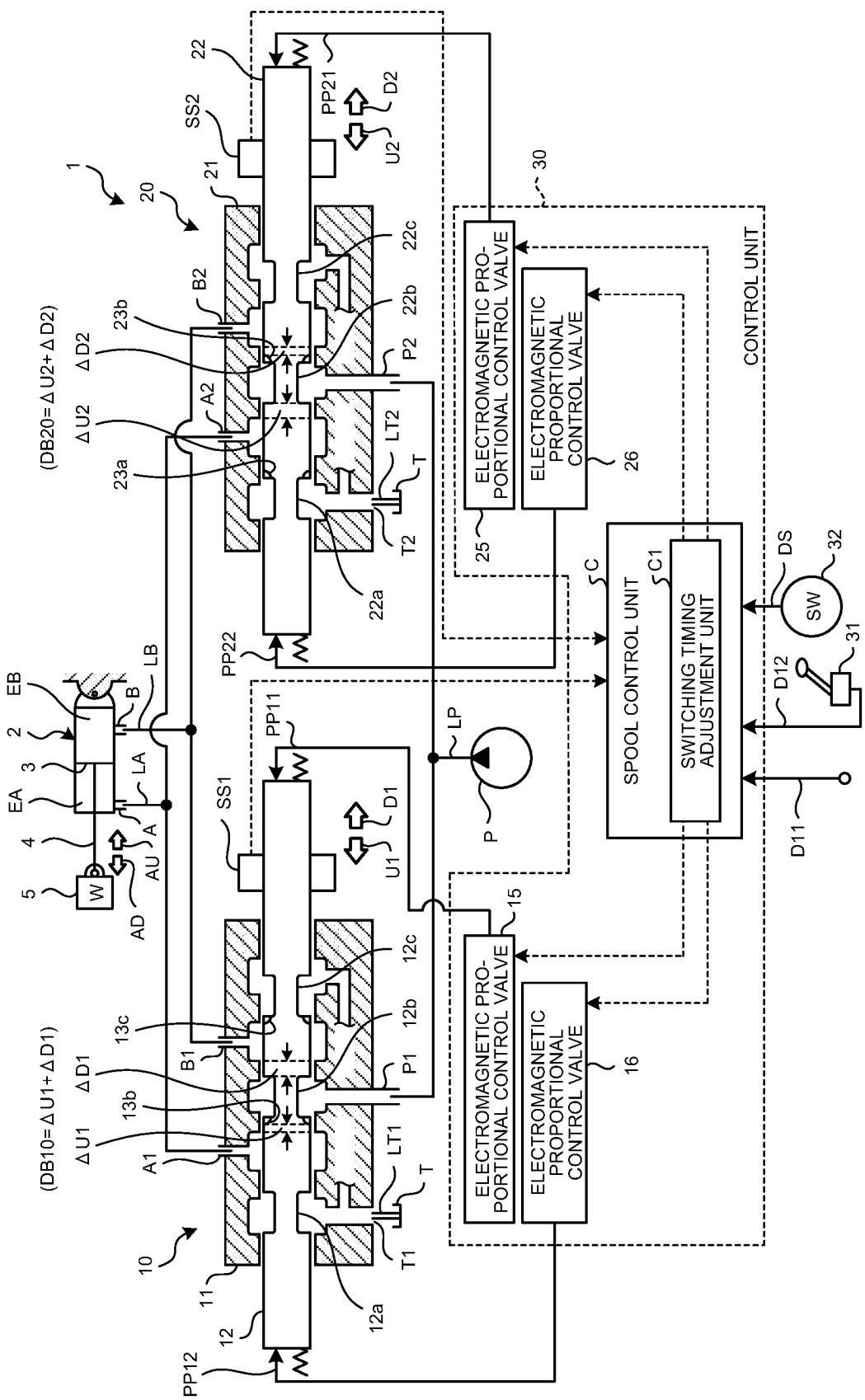
FIG. 1 is a schematic diagram illustrating a configuration of a hydraulic cylinder spool valve device according to an embodiment of the present disclosure.

FIG. 1 is a schematic diagram illustrating the configuration of a hydraulic cylinder spool valve device 1 according to an embodiment of the present disclosure. As illustrated in FIG. 1, the hydraulic cylinder spool valve device 1 has a first spool valve 10, a second spool valve 20, and a control unit 30. A hydraulic cylinder 2 controlled by the first spool valve 10 and the second spool valve 20 is, for example, a lift cylinder of a bulldozer. Once a working fluid is supplied to a cylinder head side oil chamber EA via a head side port A, the hydraulic cylinder 2 lifts a blade 5 connected to a tip of a cylinder rod 4 by retracting the cylinder rod 4 connected to a piston 3. In addition, once a working fluid is supplied to a cylinder bottom side oil chamber EB via a bottom side port B, the hydraulic cylinder 2 lowers the blade 5 by extending the cylinder rod 4.

The first spool valve 10 has a first spool 12 sliding in a valve body 11 and a first stroke detection sensor SS1 detecting the stroke of the first spool 12. The first spool 12 is slid by pilot pressures PP11 and PP12 applied to both ends from electromagnetic proportional control valves 15 and 16, respectively. The first spool valve 10 has a pump port P1, a tank port T1, a head side port A1, and a bottom side port B1. The pump port P1 is connected to a hydraulic pump P via an oil passage LP. The tank port T1 is connected to a tank T via an oil passage LT1. The head side port A1 is connected to the head side port A of the hydraulic cylinder 2 via an oil passage LA. The bottom side port B1 is connected to the bottom side port B of the hydraulic cylinder 2 via an oil passage LB. The first spool 12 illustrated in FIG. 1 is at a neutral position.

The second spool valve 20 has a second spool 22 sliding in a valve body 21 and a second stroke detection sensor SS2 detecting the stroke of the second spool 22. The second spool 22 is slid by pilot pressures PP21 and PP22 applied to both ends from electromagnetic proportional control valves 25 and 26, respectively. The second spool valve 20 has a pump port P2, a tank port T2, a head side port A2, and a bottom side port B2. The pump port P2 is connected to the hydraulic pump P via the oil passage LP. The tank port T2 is connected to the tank T via an oil passage LT2. The head side port A2 is connected to the head side port A of the hydraulic cylinder 2 via the oil passage LA. The bottom side port B2 is connected to the bottom side port B of the hydraulic cylinder 2 via the oil passage LB. The second spool 22 illustrated in FIG. 1 is at a neutral position.

The oil passage LA bifurcates into the head side ports A1 and A2 from the head side port A. In addition, the oil passage LB bifurcates into the bottom side ports B1 and B2 from the bottom side port B. Furthermore, the oil passage LP bifurcates into the pump ports P1 and P2 from the hydraulic pump P.

In addition, springs are disposed between both end portions of the valve body 11 and both end portions of the first spool 12 and a reaction force is given with respect to each of the applied pilot pressures PP11 and PP12 from both ends. Likewise, springs are respectively disposed between both end portions of the valve body 21 and both end portions of the second spool 22 and a reaction force is given with respect to each of the applied pilot pressures PP21 and PP22 from both ends. Then, the first spool 12 and the second spool 22 are positioned at a neutral point N in a case where the pilot pressures PP11, PP12, PP21, and PP22 are not applied in the first spool valve 10 and the second spool valve 20.

The control unit 30 has the electromagnetic proportional control valves 15 and 16 generating the pilot pressures PP11 and PP12, the electromagnetic proportional control valves 25 and 26 generating the pilot pressures PP21 and PP22, and a spool control unit C. The spool control unit C has a switching timing adjustment unit C1. Switching timing control by the switching timing adjustment unit C1 will be described later. Input to the spool control unit C are an automatic operation flow rate signal D11 at a time of automatic control, an operation lever stroke signal D12 by an operation of an operation lever 31 at a time of a manual operation, and a selection switch signal DS from a selection switch 32 selecting an automatic operation mode and a manual operation mode. Also input to the spool control unit C are the stroke amount that is detected by the first stroke detection sensor SS1 and the stroke amount that is detected by the second stroke detection sensor SS2. In a case where the automatic operation mode is selected, the spool control unit C precisely controls the spool stroke of the first spool 12 via the electromagnetic proportional control valves 15 and 16 based on the automatic operation flow rate signal D11 and the stroke amount detected by the first stroke detection sensor SS1 and precisely controls the spool stroke of the second spool 22 via the electromagnetic proportional control valves 25 and 26 based on the automatic operation flow rate signal D11 and the stroke amount detected by the second stroke detection sensor SS2. In a case where the manual operation mode is selected, the spool control unit C precisely controls the spool stroke of the first spool 12 via the electromagnetic proportional control valves 15 and 16 based on the operation lever stroke signal D12 and the stroke amount detected by the first stroke detection sensor SS1 and precisely controls the spool stroke of the second spool 22 via the electromagnetic proportional control valves 25 and 26 based on the operation lever stroke signal D12 and the stroke amount detected by the second stroke detection sensor SS2.

Opening Characteristics of First Spool Valve 10

Figure 2:
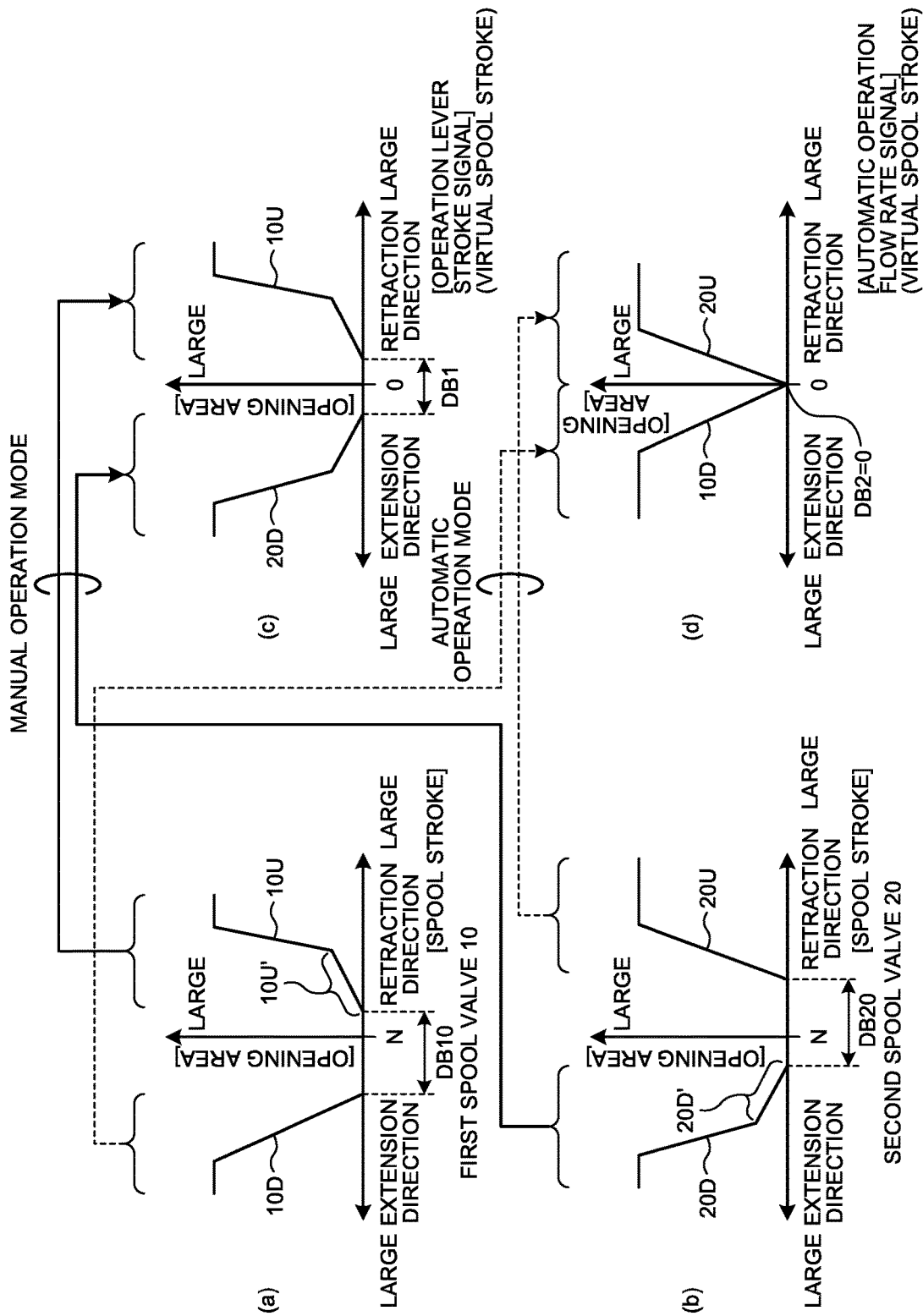
FIG. 2 is a diagram illustrating an opening characteristic in which a switching dead band is adjusted by combining an extension opening characteristic of a first spool valve and a retraction opening characteristic of a second spool valve, and an opening characteristic in which a switching dead band is adjusted by combining a retraction opening characteristic of the first spool valve and an extension opening characteristic of the second spool valve.

The first spool valve 10 has a first opening characteristic (extension opening characteristic 10D) and a third opening characteristic (retraction opening characteristic 10U) indicating the opening area-to-spool stroke relationship that is illustrated in part (a) of FIG. 2.

The extension opening characteristic 10D moves the first spool 12 in a direction D1, forms an oil passage via the pump port P1, an oil chamber formed by a small diameter portion 12b, and the bottom side port B1 and an oil passage via the head side port A1, an oil chamber formed by a small diameter portion 12a, and the tank port T1, and increases the opening area in conjunction with the movement in the direction D1. As a result, the cylinder rod 4 extends in an extension direction AD and the blade 5 is lowered.

In addition, the retraction opening characteristic 10U moves the first spool 12 in a direction U1, forms an oil passage via the pump port P1, the oil chamber formed by the small diameter portion 12b, and the head side port A1 and an oil passage via the bottom side port B1, an oil chamber formed by a small diameter portion 12c, and the tank port T1, and increases the opening area in conjunction with the movement in the direction U1. As a result, the cylinder rod 4 retracts in a retraction direction AU and the blade 5 is lifted.

A first dead band DB10 straddling the neutral point N is formed between the extension opening characteristic 10D and the retraction opening characteristic 10U. The first dead band DB10 corresponds to, for example, the spool stroke that is obtained by adding a width ΔU1 (width for the oil chamber formed by the small diameter portion 12b and the head side port A1 to open via a notch 13b by the first spool 12 moving in the direction U1) illustrated in FIG. 1 being added to a width ΔD1 (width for the oil chamber formed by the small diameter portion 12b and the bottom side port B1 to open by the first spool 12 moving in the direction D1) illustrated in FIG. 1. In the region of the first dead band DB10, no oil passage is formed in the first spool valve 10, no working fluid flows, and thus the position of the cylinder rod 4 is retained. The region of the retraction opening characteristic 10U where the spool stroke is small has a partial retraction opening characteristic 10U' and an increase in opening area is small with respect to an increase in spool stroke in this region. With the partial retraction opening characteristic 10U', control with a small opening change is possible with respect to a significant change in spool stroke, and thus high-precision blade lifting amount control can be performed. The partial retraction opening characteristic 10U' is generated by the notch 13b and a notch 13c formed in the first spool 12.

Opening Characteristics of Second Spool Valve 20

The second spool valve 20 has a fourth opening characteristic (extension opening characteristic 20D) and a second opening characteristic (retraction opening characteristic 20U) indicating the opening area-to-spool stroke relationship that is illustrated in part (b) of FIG. 2.

The extension opening characteristic 20D moves the second spool 22 in a direction D2, forms an oil passage via the pump port P2, forms an oil passage via the pump port P2, an oil chamber formed by a small diameter portion 22b, and the bottom side port B2 and an oil passage via the head side port A2, an oil chamber formed by a small diameter portion 22a, and the tank port T2, and increases the opening area in conjunction with the movement in the direction D2. As a result, the cylinder rod 4 extends in the extension direction AD and the blade 5 is lowered.

In addition, the retraction opening characteristic 20U moves the second spool 22 in a direction U2, forms an oil passage via the pump port P2, the oil chamber formed by the small diameter portion 22b, and the head side port A2 and an oil passage via the bottom side port B2, an oil chamber formed by a small diameter portion 22c, and the tank port T2, and increases the opening area in conjunction with the movement in the direction U2. As a result, the cylinder rod 4 retracts in the retraction direction AU and the blade 5 is lifted.

A second dead band DB20 straddling the neutral point N is formed between the extension opening characteristic 20D and the retraction opening characteristic 20U. The second dead band DB20 corresponds to, for example, the spool stroke that is obtained by a width ΔU2 (width for the oil chamber formed by the small diameter portion 22b and the head side port A2 to open by the second spool 22 moving in the direction U2) illustrated in FIG. 1 being added to a width ΔD2 (width for the oil chamber formed by the small diameter portion 22b and the bottom side port B2 to open via a notch 23b by the second spool 22 moving in the direction D2) illustrated in FIG. 1. In the region of the second dead band DB20, no oil passage is formed in the second spool valve 20, no working fluid flows, and thus the position of the cylinder rod 4 is retained. The region of the extension opening characteristic 20D where the spool stroke is small has a partial extension opening characteristic 20D' and an increase in opening area is small with respect to an increase in spool stroke in this region. With the partial extension opening characteristic 20D', control with a small opening change is possible with respect to a significant change in spool stroke, and thus high-precision blade lowering amount control can be performed. The partial extension opening characteristic 20D' is generated by a notch 23a and the notch 23b formed in the second spool 22.

Spool Control by Spool Control Unit C

In a case where the manual operation mode is selected, the spool control unit C performs spool control by using the first spool valve 10 and the second spool valve 20 such that the opening characteristic illustrated in part (c) of FIG. 20 is generated. This opening characteristic is a combination of the extension opening characteristic 20D, the retraction opening characteristic 10U, and a switching dead band DB1 adjusted by the switching timing adjustment unit C1.

The extension opening characteristic 20D is obtained by the first spool 12 being put in the region of the first dead band DB10 and the second spool 22 being moved in the direction D2 from the position of the second dead band DB20.

The retraction opening characteristic 10U is obtained by the second spool 22 being put in the region of the second dead band DB20 and the first spool 12 being moved in the direction U1 from the position of the first dead band DB10.

The switching dead band DB1 is set by the switching timing adjustment unit C1 by adjusting the timing (time) when the first spool 12 moves in the direction U1 from the position of the first dead band DB10 and enters the region of the retraction opening characteristic 10U after the second spool 22 is put at the position of the second dead band DB20 by moving in the direction U2 from the region of the extension opening characteristic 20D.

In addition, the switching dead band DB1 is set by the switching timing adjustment unit C1 by adjusting the timing (time) when the second spool 22 moves in the direction D2 from the position of the second dead band DB20 and enters the region of the extension opening characteristic 20D after the first spool 12 is put at the position of the first dead band DB10 by moving in the direction D1 from the region of the retraction opening characteristic 10U.

In a case where the automatic operation mode is selected, the spool control unit C performs spool control by using the first spool valve 10 and the second spool valve 20 such that the opening characteristic illustrated in part (d) of FIG. 2 is generated. This opening characteristic is a combination of the extension opening characteristic 10D, the retraction opening characteristic 20U, and a switching dead band DB2 adjusted by the switching timing adjustment unit C1. In this automatic operation mode, the responsiveness of switching between the extension opening characteristic 10D and the retraction opening characteristic 20U is enhanced by the switching dead band DB2 being zero.

The extension opening characteristic 10D is obtained by the first spool 12 being moved in the direction D1 from the position of the first dead band DB10 with the second spool 22 standing by in the region of the second dead band DB20.

The retraction opening characteristic 20U is obtained by the second spool 22 being moved in the direction U2 from the position of the second dead band DB20 with first spool 12 standing by in the region of the first dead band DB10.

The switching dead band DB2 is set by the switching timing adjustment unit C1 by adjusting the timing (time) when the second spool 22 moves in the direction U2 from the position of the second dead band DB20 and enters the region of the retraction opening characteristic 20U after the first spool 12 is put at the position of the first dead band DB10 by moving in the direction U1 from the region of the extension opening characteristic 10D.

In addition, the switching dead band DB2 is set by the switching timing adjustment unit C1 by adjusting the timing (time) when the first spool 12 moves in the direction D1 from the position of the first dead band DB10 and enters the region of the extension opening characteristic 10D after the second spool 22 is put at the position of the second dead band DB20 by moving in the direction D2 from the region of the retraction opening characteristic 20U. The switching timing adjustment in the automatic operation mode is performed such that the switching timings correspond to each other.

The opening characteristics illustrated in part (c) and (d) of FIG. 2 use two spool valves, that is, the first spool valve 10 and the second spool valve 20. Accordingly, the horizontal axis is a virtual spool stroke assuming one spool valve. The horizontal axis in part (c) of FIG. 2 corresponds to the operation lever stroke signal D12 and the horizontal axis in part (d) of FIG. 2 corresponds to the automatic operation flow rate signal D11.

In addition, as illustrated in part (a) and (b) of FIG. 2, each of the opening characteristic of the first spool valve 10 and the opening characteristic of the second spool valve 20 is asymmetric with respect to the neutral point N. The obtained opening characteristics in part (c) and (d) of FIG. 2 are symmetric with respect to the starting point 0 (neutral point).

Switching Timing Zero Adjustment in Automatic Operation Mode

In a case where the spool control unit C adjusts the switching dead band DB2 to zero, the spool control unit C causes the other first spool 12 or the other second spool 22 to stand by at the position immediately before opening where the other first spool 12 following switching or the other second spool 22 following switching has a spool opening of zero. In other words, the spool control unit C performs control for standby at the position where no working fluid circulates via the spool.

Figure 3:
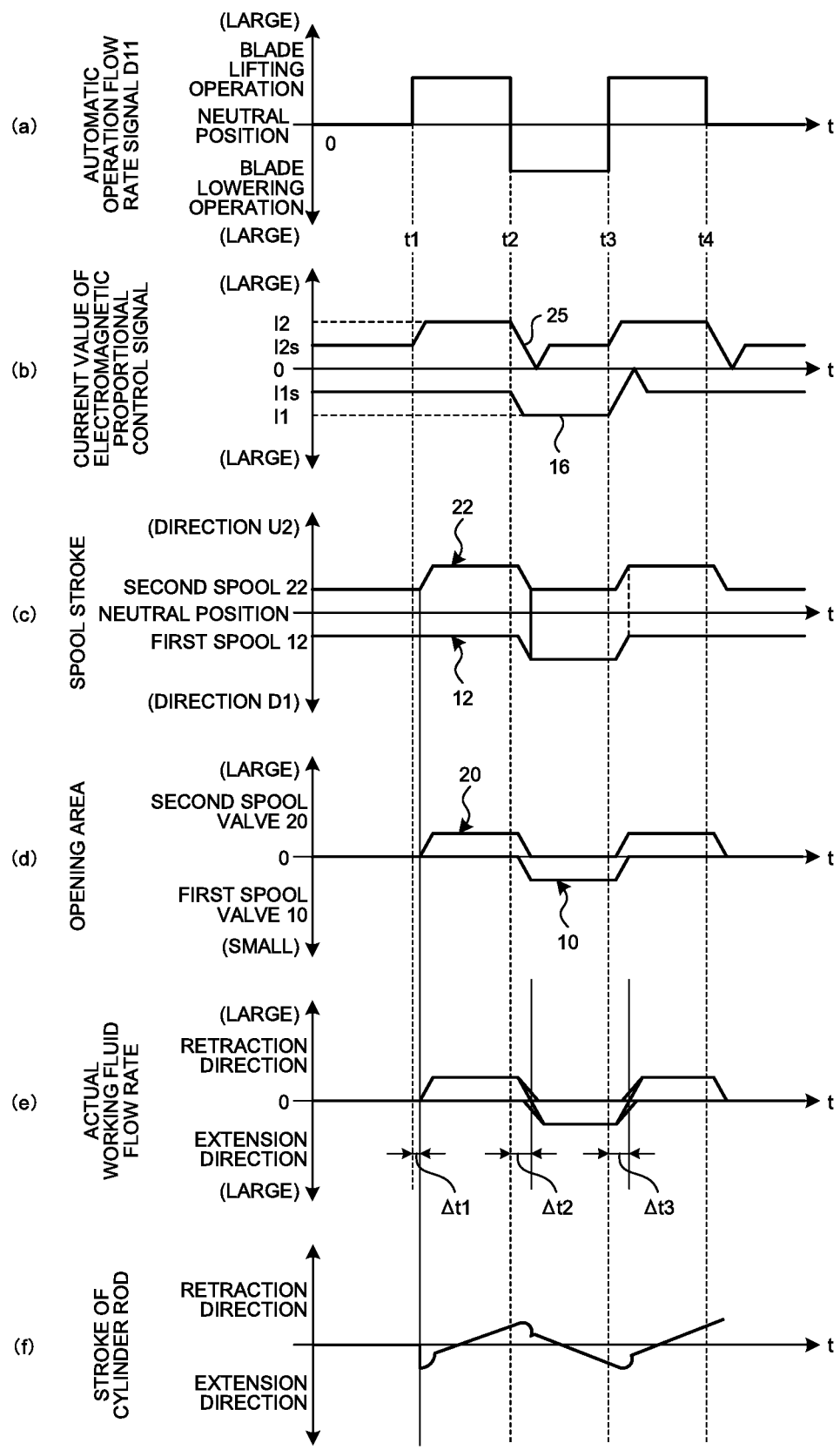
FIG. 3 is a time chart illustrating a relationship among an electromagnetic proportional control signal for blade lifting and lowering operations based on an automatic operation flow rate signal in an automatic operation mode, the spool strokes of first and second spools, the opening areas of the first and second spool valves, the actual working fluid flow rate from the first and second spool valves to a hydraulic cylinder, and the cylinder stroke of a cylinder rod.
Figure 4:
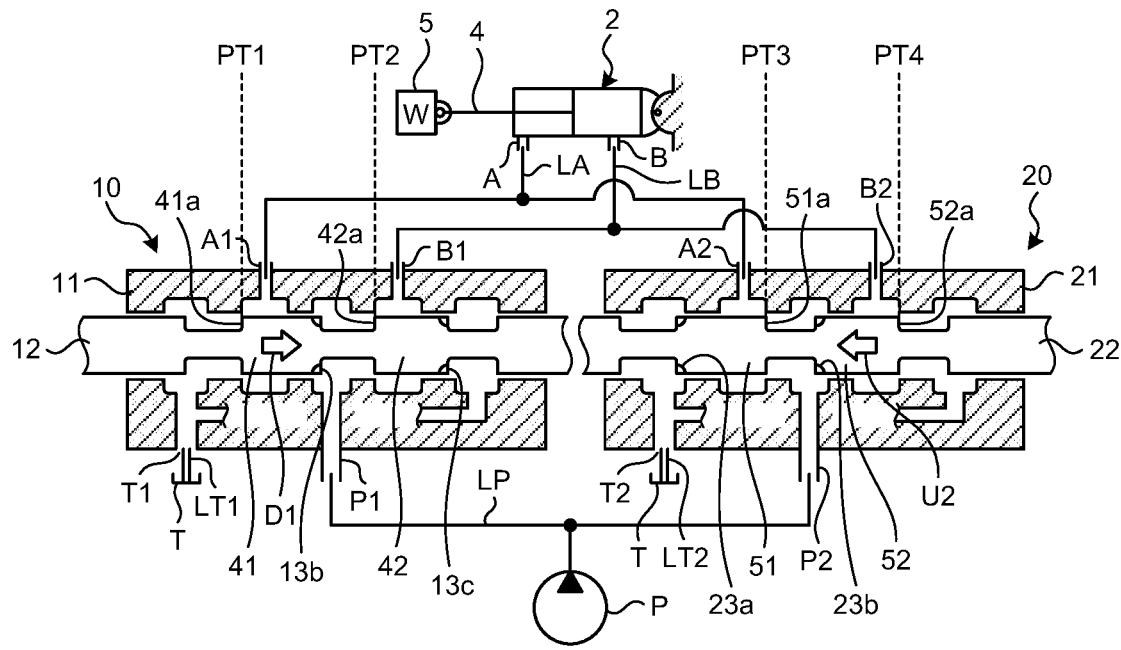
FIG. 4 is a diagram illustrating the initial positions of the first spool and the second spool in the automatic operation mode in which the switching dead band is zero.
Figure 5:
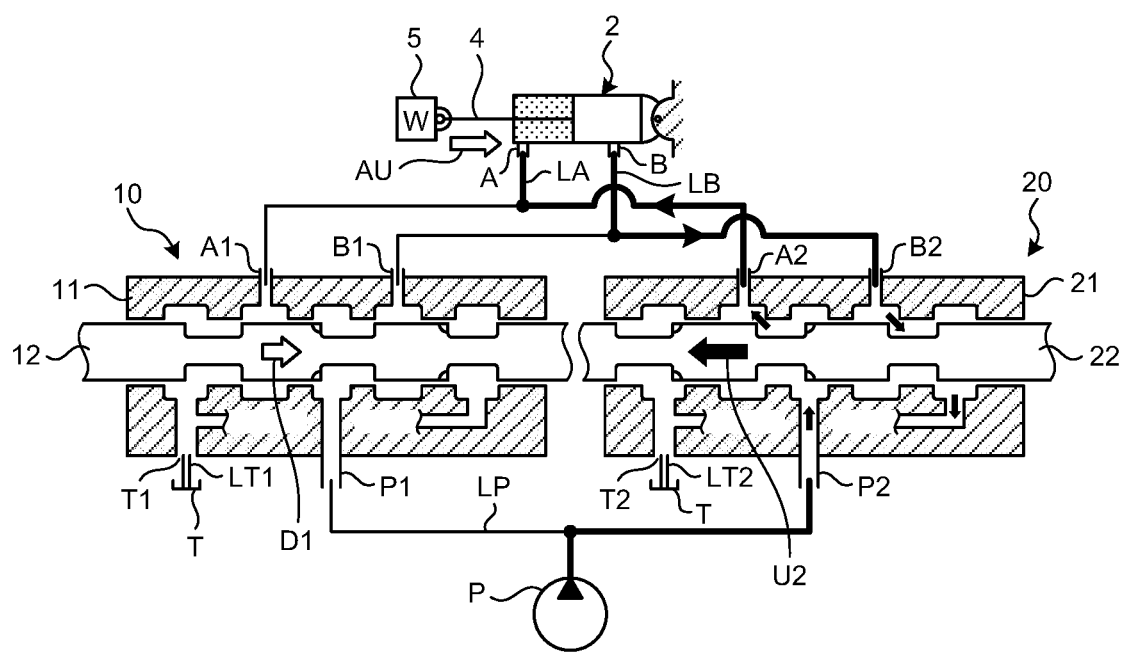
FIG. 5 is a diagram illustrating the positions of the first spool and the second spool after a transition from the state of FIG. 4 to a state where the cylinder rod is retracted.
Figure 6:
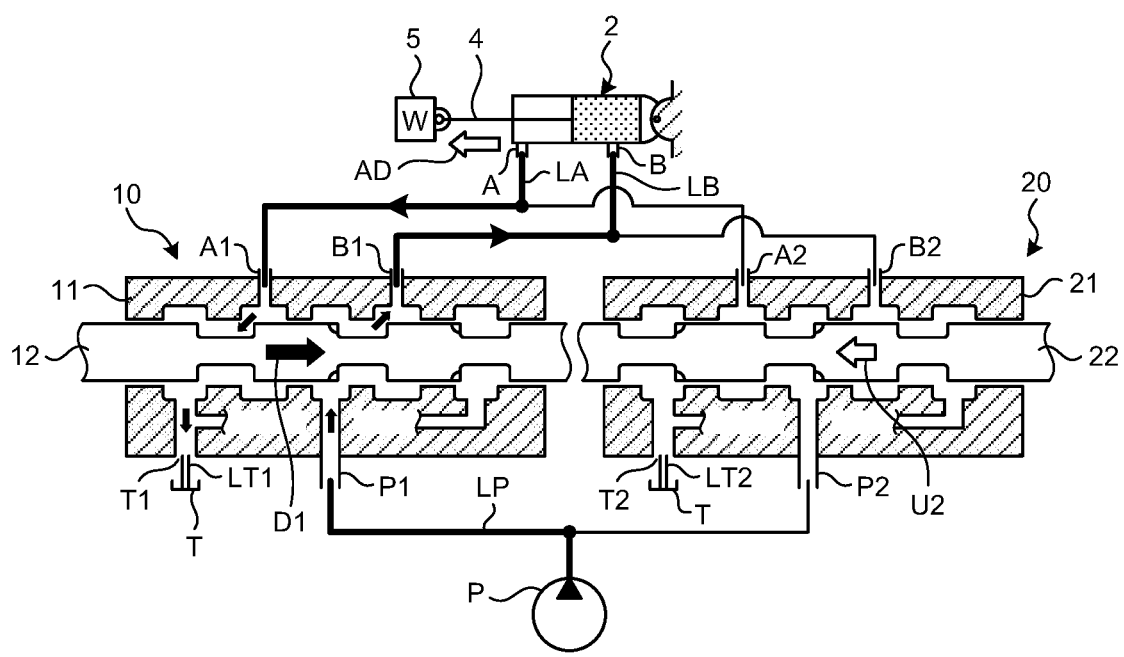
FIG. 6 is a diagram illustrating the positions of the first spool and the second spool after a transition from the state of FIG. 4 to a state where the cylinder rod is extended.

The switching timing zero adjustment will be described in detail with reference to FIGS. 3 to 6. FIG. 3 is a time chart illustrating a relationship among an electromagnetic proportional control signal for blade lifting and lowering operations based on the automatic operation flow rate signal D11 in the automatic operation mode, the spool strokes of the first and second spools 12 and 22, the opening areas of the first and second spool valves 10 and 20, the actual working fluid flow rate from the first and second spool valves 10 and 20 to the hydraulic cylinder 2, and the cylinder stroke of the cylinder rod 4. FIG. 4 is a diagram illustrating the initial positions of the first spool 12 and the second spool 22 in the automatic operation mode in which the switching dead band DB2 is zero. FIG. 5 is a diagram illustrating the positions of the first spool 12 and the second spool 22 after a transition from the state of FIG. 4 to a state where the cylinder rod 4 is retracted. FIG. 6 is a diagram illustrating the positions of the first spool 12 and the second spool 22 after a transition from the state of FIG. 4 to a state where the cylinder rod 4 is extended.

In FIG. 3, the amount of the blade lifting and lowering operations based on the automatic operation flow rate signal D11 is zero as illustrated in part (a) of FIG. 30 until time point t1 when the blade lifting operation (retracting of the cylinder rod 4) is initiated. At this time, the switching timing adjustment unit C1 instructs the electromagnetic proportional control valve 16 to cause a current I1s as a standby current to flow as illustrated in part (b) of FIG. 30, and then the first spool 12 moves in the direction D1 as illustrated in part (c) of FIG. 3 and the first spool valve 10 is put into a standby state at the position immediately before opening as illustrated in FIG. 4. Likewise, the switching timing adjustment unit C1 instructs the electromagnetic proportional control valve 25 to cause a current I1s as a standby current to flow as illustrated in part (b) of FIG. 3, and then the second spool 22 moves in the direction U2 as illustrated in part (c) of FIG. 3 and the second spool valve 20 is put into a standby state at the position immediately before opening as illustrated in FIG. 4.

As illustrated in FIG. 4, the first spool valve 10 being at the position immediately before opening means that the end portions 41a and 42a of large diameter portions 41 and 42 of the first spool 12 being positioned at positions PT1 and PT2 of the valve body 11, respectively. In addition, the second spool valve 20 being at the position immediately before opening means that the end portions 51a and 52a of large diameter portions 51 and 52 of the second spool 22 being positioned at positions PT3 and PT4 of the valve body 21, respectively.

Once the automatic operation flow rate signal D11 for the blade lifting operation is subsequently input at time point t1 to t2, the switching timing adjustment unit C1 instructs the electromagnetic proportional control valve 25 to cause a current I2 corresponding to the automatic operation flow rate signal D11 to flow as illustrated in part (b) of FIG. 3. The first spool 12 maintains the current stroke position. Then, the second spool 22 further moves in the direction U2 as illustrated in part (c) of FIG. 3 and the second spool valve 20 opens as illustrated in part (d) of FIG. 3. As a result, the working fluid flows from the second spool valve 20 to the hydraulic cylinder 2 side and the cylinder rod 4 retracts in the retracting direction AU as illustrated in part (e) of FIG. 3 and FIG. 5. Then, the cylinder rod 4 retracts in the retracting direction AU and the blade 5 is lifted, as illustrated in part (f) of FIG. 3, as the amount of the working fluid toward the hydraulic cylinder 2 increases.

Once the switching from the blade lifting operation to the blade lowering operation is subsequently initiated at time point t2, that is, once the automatic operation flow rate signal D11 for the blade lowering operation is subsequently input at time point t2, the switching timing adjustment unit C1 instructs the electromagnetic proportional control valve 16 to cause a current I1 corresponding to the automatic operation flow rate signal D11 to flow and instructs the electromagnetic proportional control valve 25 to cause the current I2s to flow after temporarily maintaining a zero current as illustrated in part (b) of FIG. 3.

Then, the first spool 12 further moves in the direction D1 from the standby position as illustrated in part (c) of FIG. 3 and the first spool valve 10 opens as illustrated in part (d) of FIG. 3. The second spool 22 moves in the direction D2 and returns to the standby position as illustrated in part (c) of FIG. 3. The current I2s as a standby current is applied for this return to the standby position. As a result, the working fluid flows from the first spool valve 10 to the hydraulic cylinder 2 side and the cylinder rod 4 extends in the extension direction AD as illustrated in part (e) of FIG. 3 and FIG. 6. Then, the cylinder rod 4 extends in the extension direction AD and the blade 5 is lowered, as illustrated in part (f) of FIG. 3, as the amount of the working fluid toward the hydraulic cylinder 2 increases.

Once the switching from the blade lowering operation to the blade lifting operation is subsequently initiated at time point t3, that is, once the automatic operation flow rate signal D11 for the blade lifting operation is subsequently input at time point t3, the switching timing adjustment unit C1 instructs the electromagnetic proportional control valve 25 to cause the current I2 corresponding to the automatic operation flow rate signal D11 to flow from a current Is as a standby current and instructs the electromagnetic proportional control valve 16 to cause the current I1s to flow after temporarily maintaining a zero current as illustrated in part (b) of FIG. 3.

Then, the second spool 22 further moves in the direction U2 from the standby position as illustrated in part (c) of FIG. 3 and the second spool valve 20 opens as illustrated in part (d) of FIG. 3. The first spool 12 moves in the direction U1 and returns to the standby position as illustrated in part (c) of FIG. 3. The current Is as a standby current is applied for this return to the standby position. As a result, the working fluid flows from the second spool valve 20 to the hydraulic cylinder 2 side again and the cylinder rod 4 retracts in the retracting direction AU as illustrated in part (e) of FIG. 3 and FIG. 5. Then, the cylinder rod 4 extends in the retracting direction AU and the blade 5 is lifted, as illustrated in part (f) of FIG. 3, as the amount of the working fluid toward the hydraulic cylinder 2 increases.

Once the automatic operation flow rate signal D11 is subsequently input at time point t4 for a zero blade lifting operation (neutral position), the switching timing adjustment unit C1 instructs the electromagnetic proportional control valve 25 to cause the current Its to flow after temporarily maintaining a zero current as illustrated in part (b) of FIG. 3. As a result, each of the first spool 12 and the second spool 22 is positioned at the standby position as illustrated in part (c) of FIG. 3 and FIG. 4. Then, the opening areas of the first spool valve 10 and the second spool valve 20 become zero, no working fluid is supplied to the hydraulic cylinder 2 side, and the cylinder rod 4 maintains the retracted state at time point t4.

Here, each of the first spool 12 and the second spool 22 is disposed at the standby position immediately before opening, and thus a time lag Δt1 until the actual working fluid flow from time point t1 when the blade lifting operation is performed from the neutral position, a time lag Δt2 until the switching of the actual working fluid flow from time point t2 when the switching from the blade lifting operation to the blade lowering operation is performed, and a time lag Δt3 until the switching of the actual working fluid flow from time point t3 when the switching from the blade lowering operation to the blade lifting operation is performed are small.

As described above, in the automatic operation mode, the standby position of the neutral state with no extension/retraction command signal is as illustrated in FIG. 4. In a case where an extension command signal is entered, the first spool 12 is moved in the D1 direction as illustrated in FIG. 6. In a case where a retraction command signal is entered, the second spool 22 is moved in the U2 direction as illustrated in FIG. 5. The dead band DB2 can be adjusted to zero as a result of the instantaneous switching as described above.

Although only the control by the electromagnetic proportional control valves 16 and 25 has been described in the above description of FIGS. 3 to 6 for convenience of description, the control by the electromagnetic proportional control valve 15 cooperates in a case where the spool control by the electromagnetic proportional control valve 16 is performed. In addition, the control by the electromagnetic proportional control valve 26 cooperates in a case where the spool control by the electromagnetic proportional control valve 25 is performed.

In addition, the length (virtual spool stroke) of the dead band DB2 can be adjusted through adjustment of the time when the respective end portions 41a and 42a of the large diameter portions 41 and 42 of the first spool 12 start moving respectively from the positions PT1 and PT2 of the valve body 11 and respective end portions 51b and 52b of the large diameter portions 51 and 52 of the second spool 22 start moving respectively from the positions PT3 and PT4.

Furthermore, the second spool 22 may be allowed to stand by after being moved in accordance with the movement of the first spool 12 such that the timing when the first spool 12 is at the positions PT1 and PT2 immediately before opening and the timing when the second spool 22 is at the positions PT3 and PT4 immediately before opening are simultaneous. Alternatively, a time point when the first spool 12 enters the region of the dead band DB10 from the moving state of the first spool 12 may be predicted for the movement of the second spool 22 in the dead band DB20 to be controlled and the switching dead band DB2 may be adjusted to zero with the time point when the first spool 12 enters the region of the dead band DB10 and the time point when the second spool 22 leaves the region of the dead band DB20 corresponding to each other.

Although the first spool valve 10 has the extension opening characteristic 10D and the retraction opening characteristic 10U and the second spool valve 20 has the extension opening characteristic 20D and the retraction opening characteristic 20U in the embodiment described above, the first spool valve 10 may have only the extension opening characteristic 10D and the second spool valve 20 may have only the retraction opening characteristic 20U or the first spool valve 10 may have only the retraction opening characteristic 10U and the second spool valve 20 may have only the extension opening characteristic 20D instead. The switching dead band DB1 and the switching dead band DB2 can still be adjusted in this case.

In the embodiment described above, independent spool control with respect to the first spool valve 10 and the second spool valve 20 allows adjustment to any switching dead band and allows the opening characteristic for a zero switching dead band to be obtained in particular. In this case, the neutral point N of the first spool valve 10 is in the first dead band DB10 and the neutral point N of the second spool valve 20 is in the second dead band DB20, and thus the occurrence of working fluid leakage that is attributable to a natural drop of the cylinder rod 4 in a case where the cylinder rod 4 is stopped can be prevented.

Although a bulldozer blade is described in the present embodiment, the present disclosure may also be applicable to a hydraulic cylinder spool valve device of a working machine such as an excavator and a wheel loader.

REFERENCE SIGNS LIST

1 HYDRAULIC CYLINDER SPOOL VALVE DEVICE
2 HYDRAULIC CYLINDER
3 PISTON
4 CYLINDER ROD
5 BLADE
10, 20 SPOOL VALVE
10D, 20D EXTENSION OPENING CHARACTERISTIC
10U, 20U RETRACTION OPENING CHARACTERISTIC
11, 21 VALVE BODY
12, 22 SPOOL
12a, 12b, 12c, 22a, 22b, 22c SMALL DIAMETER PORTION
13b, 13c, 23a, 23b NOTCH
15, 25 ELECTROMAGNETIC PROPORTIONAL CONTROL VALVE
30 CONTROL UNIT
31 OPERATION LEVER
32 SELECTION SWITCH
41, 42, 51, 52 LARGE DIAMETER PORTION
41a, 42a, 51a, 52a END PORTION
A, A1, A2 HEAD SIDE PORT
B, B1, B2 BOTTOM SIDE PORT
C SPOOL CONTROL UNIT
C1 SWITCHING TIMING ADJUSTMENT UNIT
D11 AUTOMATIC OPERATION FLOW RATE SIGNAL
D12 OPERATION LEVER STROKE SIGNAL
DB1, DB2, DB3 SWITCHING DEAD BAND

DB10 FIRST DEAD BAND
DB20 SECOND DEAD BAND
DS SELECTION SWITCH SIGNAL
EA CYLINDER HEAD SIDE OIL CHAMBER
EB CYLINDER BOTTOM SIDE OIL CHAMBER
LA, LB, LP, LT1, LT2 OIL PASSAGE
N NEUTRAL POINT
HYDRAULIC PUMP
P1, P2 PUMP PORT
PP11, PP12, PP21, PP22 PILOT PRESSURE
SS1, SS2 STROKE DETECTION SENSOR
T TANK
T1, T2 TANK PORT

The invention claimed is:

1. A hydraulic cylinder spool valve device, which extends and retracts a cylinder rod of a hydraulic cylinder by controlling a flow direction and a flow rate of a working fluid by moving spools in accordance with operation command values, the hydraulic cylinder spool valve device comprising:
   a first spool valve having a characteristic which includes a first dead band and a first opening characteristic in which an opening area of the working fluid, supplied in a direction in which the cylinder rod is extended, increases in accordance with a movement of a first spool;
   a second spool valve having a characteristic which includes a second dead band and a second opening characteristic in which the opening area of the working fluid, supplied in a direction in which the cylinder rod is retracted, increases in accordance with a movement of a second spool; and
   a controller configured to, when the working fluid is supplied in accordance with the first opening characteristic, perform communication with the hydraulic cylinder by using the first spool valve and position the second spool of the second spool valve within the second dead band, configured to, when the working fluid is supplied in accordance with the second opening characteristic, perform communication with the hydraulic cylinder by using the second spool valve and position the first spool of the first spool valve within the first dead band, and configured to, during switching between the first opening characteristic and the second opening characteristic, adjust a characteristic of a switching dead band between the first opening characteristic and the second opening characteristic,
   wherein
   the characteristic of the first spool valve further includes a third opening characteristic in which the opening area of the working fluid, supplied in the direction in which the cylinder rod is retracted, increases in accordance with the movement of the first spool from the first dead band,
   the characteristic of the second spool valve further includes a fourth opening characteristic in which the opening area of the working fluid, supplied in the direction in which the cylinder rod is extended, increases in accordance with the movement of the second spool from the second dead band, and
   the controller configured to, when the working fluid is supplied in accordance with the third opening characteristic, further perform communication with the hydraulic cylinder by using the second spool valve and position the second spool of the second spool valve within the second dead band, configured to, when the working fluid is supplied in accordance with the fourth opening characteristic, perform communication with the hydraulic cylinder by using the second spool valve and position the first spool of the first spool valve within the first dead band, and configured to, during switching between the third opening characteristic and the fourth opening characteristic, adjust a switching dead band between the third opening characteristic and the fourth opening characteristic.

2. The hydraulic cylinder spool valve device according to claim 1, wherein the controller is configured to adjust the switching dead band to zero.

3. The hydraulic cylinder spool valve device according to claim 2, wherein the controller is further configured to perform control for setting the opening of the second spool immediately after adjusting the switching dead band to zero and causing the first spool or the second spool to stand by at a position immediately before opening when the controller adjusts the switching dead band to zero.

4. The hydraulic cylinder spool valve device according to claim 2, further comprising a selection switch to select between an automatic operation mode and a manual operation mode,
   wherein the controller configured to set the switching dead band to zero and perform spool control for generating an opening characteristic in which the first opening characteristic and the second opening characteristic are combined with each other when the automatic operation mode is selected, and set the switching dead band to have a predetermined value and perform spool control for generating an opening characteristic in which a third opening characteristic and a fourth opening characteristic are combined with each other when the manual operation mode is selected.

5. The hydraulic cylinder spool valve device according to claim 1, further comprising a selection switch to select between an automatic operation mode and a manual operation mode,
   wherein the controller configured to sets the switching dead band to zero and perform spool control for generating an opening characteristic in which the first opening characteristic and the second opening characteristic are combined with each other when the automatic operation mode is selected, and set the switching dead band to have a predetermined value and perform spool control for generating an opening characteristic in which the third opening characteristic and the fourth opening characteristic are combined with each other when the manual operation mode is selected.

6. The hydraulic cylinder spool valve device according to claim 1, wherein
   the first opening characteristic and the third opening characteristic of the first spool valve are asymmetric with respect to a neutral position of the first spool, and
   the fourth opening characteristic and the second opening characteristic of the second spool valve are asymmetric with respect to a neutral position of the second spool.

7. The hydraulic cylinder spool valve device according to claim 1, further comprising:
   a first stroke detection sensor configured to detect a stroke of the first spool; and
   a second stroke detection sensor configured to detect a stroke of the second spool,
   wherein the controller is configured to adjusts the switching dead band based on the strokes detected by the first stroke detection sensor and the second stroke detection sensor.

8. A hydraulic cylinder spool valve device, which extends and retracts a cylinder rod of a hydraulic cylinder by controlling a flow direction and a flow rate of a working fluid by moving spools in accordance with operation command values, the hydraulic cylinder spool valve device comprising:
- a first spool valve having a characteristic which includes a first dead band and a first opening characteristic in which an opening area of the working fluid, supplied in a direction in which the cylinder rod is extended, increases in accordance with a movement of a first spool;
- a second spool valve having a characteristic which includes a second dead band and a second opening characteristic in which the opening area of the working fluid, supplied in a direction in which the cylinder rod is retracted, increases in accordance with a movement of a second spool; and
- a controller configured to, when the working fluid is supplied in accordance with the first opening characteristic, perform communication with the hydraulic cylinder by using the first spool valve and position the second spool of the second spool valve within the second dead band, configured to, when the working fluid is supplied in accordance with the second opening characteristic, perform communication with the hydraulic cylinder by using the second spool valve and position the first spool of the first spool valve within the first dead band, and configured to, during switching between the first opening characteristic and the second opening characteristic, adjust a characteristic of a switching dead band between the first opening characteristic and the second opening characteristic, wherein the controller is configured to adjust the switching dead band to zero, wherein the first opening characteristic and a third opening characteristic of the first spool valve are asymmetric with respect to a neutral position of the first spool, and a fourth opening characteristic and the second opening characteristic of the second spool valve are asymmetric with respect to a neutral position of the second spool.

* * * * *